(12) United States Patent
Sala et al.

(10) Patent No.: US 7,349,394 B2
(45) Date of Patent: Mar. 25, 2008

(54) FILTERING AND FORWARDING FRAMES AT AN OPTICAL LINE TERMINAL

(75) Inventors: Dolors Sala, Atlanta, GA (US); John O. Limb, Atlanta, GA (US); Ajay Chandra V. Gummalla, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 897 days.

(21) Appl. No.: 10/353,054

(22) Filed: Jan. 29, 2003

(65) Prior Publication Data

US 2003/0152389 A1    Aug. 14, 2003

Related U.S. Application Data

(63) Continuation of application No. 10/361,181, filed on Dec. 11, 2002.

(60) Provisional application No. 60/393,096, filed on Jul. 3, 2002, provisional application No. 60/367,317, filed on Mar. 26, 2002, provisional application No. 60/339,442, filed on Dec. 14, 2001.

(51) Int. Cl.
*H04L 12/56* (2006.01)

(52) U.S. Cl. ...................... 370/392; 370/475

(58) Field of Classification Search ............... 370/392, 370/475
See application file for complete search history.

(56) References Cited

U.S. PATENT DOCUMENTS

| | | | |
|---|---|---|---|
| 5,648,958 A | 7/1997 | Counterman | |
| 5,854,701 A | 12/1998 | Clarke et al. | |
| 5,978,374 A | 11/1999 | Ghaibeh et al. | |
| 6,023,467 A * | 2/2000 | Abdelhamid et al. | 370/236.2 |
| 6,229,788 B1 | 5/2001 | Graves et al. | |
| 6,804,256 B2 * | 10/2004 | Chang | 370/468 |
| 6,848,053 B1 | 1/2005 | Monzawa et al. | |
| 6,970,461 B2 * | 11/2005 | Unitt et al. | 370/390 |
| 7,016,608 B1 * | 3/2006 | Ball et al. | 398/71 |

(Continued)

OTHER PUBLICATIONS

U.S. Appl. No. 10/316,181, filed Dec. 11, 2002, Sala et al.

(Continued)

*Primary Examiner*—Brian Nguyen
(74) *Attorney, Agent, or Firm*—Sterne, Kessler, Goldstein & Fox, P.L.L.C.

(57) ABSTRACT

An optical line terminal (OLT) monitors and controls communications with a plurality of optical nodes (ONs), such as optical network units (ONUs) and/or optical network terminators (ONTs), within a passive optical network (PON), such as, but not exclusively, an Ethernet-based passive optical node (EPON). A tagging mechanism is implemented to identify an origin ON that introduces a frame into the PON segment linking the origin ON with the OLT. The origin ON produces a PON tag to associate its identifier (ON_ID) to the frame. The PON tag facilitates filtering and forwarding operations, and enables the physical layer interface (PHY) to the PON segment to emulate a point-to-point and/or shared communications link. The PON tag allows a MAC control layer to create virtual ports to traffic incoming and outgoing optical signals, and supply the virtual ports to a forwarding entity for frame filtering and forwarding. The PON tag also allows an OLT and ON to track the origination and/or destination of a frame within the PON segment, and accept or reject the frame based on the contents of the PON tag.

33 Claims, 11 Drawing Sheets

U.S. PATENT DOCUMENTS

| | | |
|---|---|---|
| 2002/0163921 A1 | 11/2002 | Etheridge et al. |
| 2003/0137975 A1 | 7/2003 | Song et al. |
| 2004/0202174 A1* | 10/2004 | Kim et al. ............... 370/395.1 |

OTHER PUBLICATIONS

U.S. Appl. No. 10/353,053, filed Jan. 29, 2003, Sala et al.

U.S. Appl. No. 10/316,181, entitled "Filtering and Forwarding Frames Within an Optical Network," filed Dec. 11, 2002.

Office Action for U.S. Appl. No. 10/316,181, dated Apr. 28, 2006 6 pages.

U.S. Appl. No. 10/353,053, entitled "Filtering and Forwarding Frames Within an Optical Network," Jan. 29, 2003.

Office Action for U.S. Appl. No. 10/353,053, dated Aug. 23, 2006 6 pages.

International Search Report for International Application No. PCT/US02/39848, issued on Aug. 19, 2003.

* cited by examiner

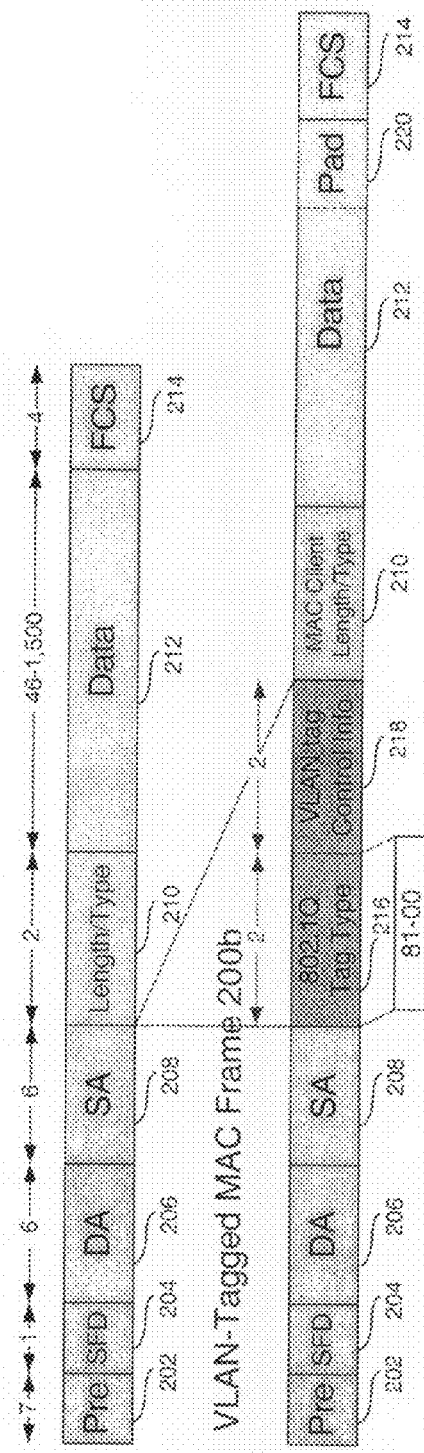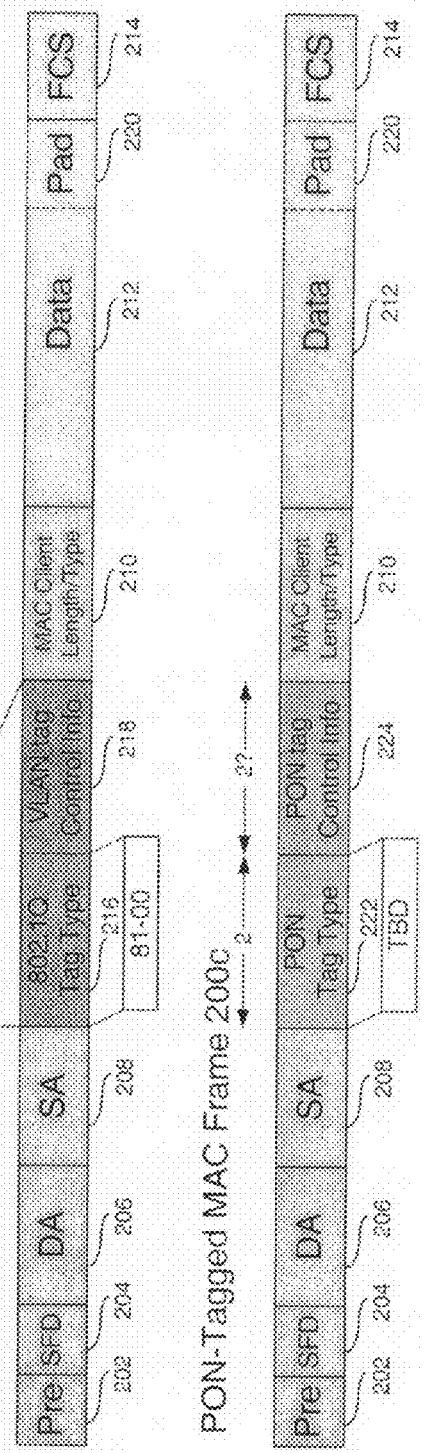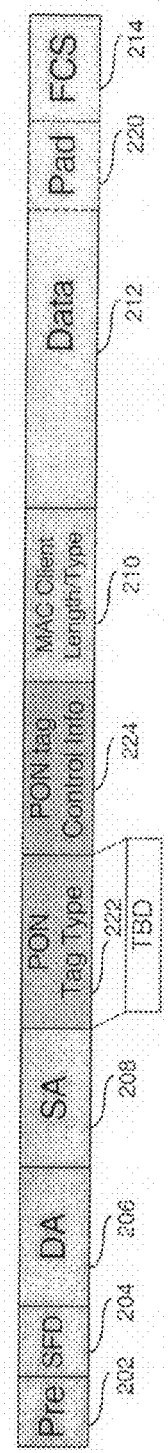
FIG. 2a Basic MAC Frame 200a
FIG. 2b VLAN-Tagged MAC Frame 200b
FIG. 2c PON-Tagged MAC Frame 200c

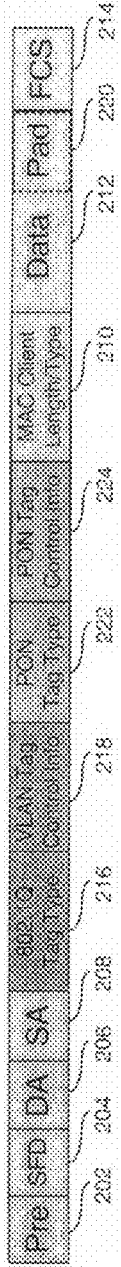
FIG. 2d  Double Tagged MAC Frame 200d
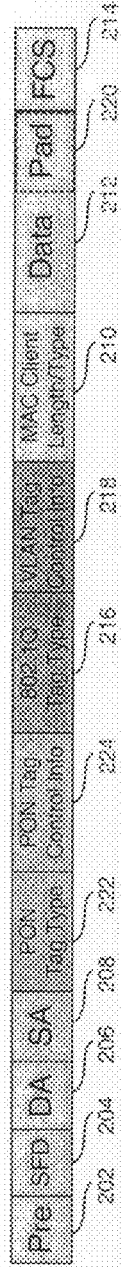
FIG. 2e  Double Tagged MAC Frame 200e
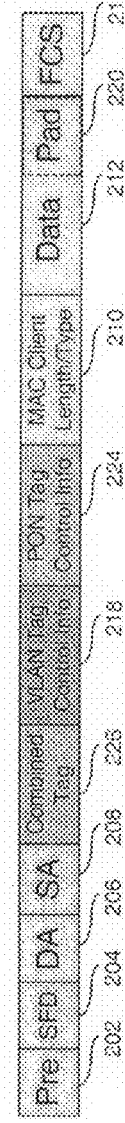
FIG. 2f  Combined Tagged MAC Frame 200f
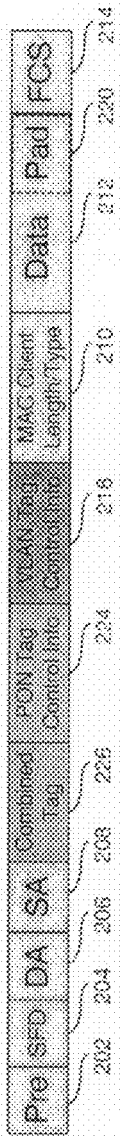
FIG. 2g  Combined Tagged MAC Frame 200g

FILTERING AND FORWARDING FRAMES AT AN OPTICAL LINE TERMINAL

This application is a continuation of U.S. patent application Ser. No. 10/316,181, filed Dec. 11, 2002, by Sala et al., entitled "Filtering and Forwarding Frames within an Optical Network," incorporated herein by reference. This application also claims the benefit of U.S. provisional application No. 60/339,442, filed Dec. 14, 2001, by Sala et al., entitled "EPON Compliance Framework and Solution," incorporated herein by reference; U.S. Provisional Application No. 60/367,317, filed Mar. 26, 2002, by Sala et al., entitled "EPON Compliance Framework and Solution," incorporated herein by reference; and U.S. Provisional Application No. 60/393,096, filed Jul. 3, 2002, by Gummalla et al., entitled "System and Method for Supporting Security and Other Services in an Ethernet Passive Optical Network," incorporated herein by reference.

BACKGROUND OF THE INVENTION

1. Field of the Invention

The present invention relates generally to communications networking, and more specifically, to filtering and forwarding frames in an optical network.

2. Related Art

In regards to communications networks, there is a continuous challenge to achieve an optimal balance among various network characteristics. Such characteristics include bandwidth demand and quality of service parameters, such as latency, loss, or priority. For example, data-over-cable networks presently are expanding the variety of services traditionally provided to subscribers. In addition to television broadcasts, cable providers are offering telephony, messaging, and Internet services. As a result, additional bandwidth is needed to support the timely delivery of these services. Moreover, traditional cable broadcasts primarily require one-way communication from a cable service provider to a subscriber's home. As interactive or personal television services and other nontraditional cable services continue to be offered, communications media used to support one-way communications must now contend with an increased demand for bi-directional communications.

Optical networks are evolving as a solution to bandwidth limitations prevalent on communication networks. For example, a passive optical network (PON) can be built to gain bandwidth efficiency and reduce protocol overhead. A typical PON consists of an optical line terminal (OLT) that manages communications with a plurality of optical network units (ONUs). Conventional PON topology has a shared upstream and a broadcast downstream. The ONUs have the opportunity to listen to the downstream broadcasts. However, the OLT uses time division multiplexing to enable the ONUs to send frames containing data and/or requests in assigned slots in the upstream. Frames sent in the upstream from one ONU are not seen by the other ONUs.

The communications path between an OLT and its ONUs is referred to as a PON segment. A conventional PON segment is neither a point-to-point (P2P) segment nor a shared segment. In a typical shared segment, a frame is seen by all attached devices. In a PON segment, however, frames on the upstream are not seen by any other device. When upstream frames arrive at the OLT from a PON segment, the frames are processed, filtered and forwarded to the next destination. The OLT uses a forwarding entity (such as, a bridge or router) to execute the filtering and forwarding operations. Conventional forwarding entities only support P2P or shared segments, and as discussed, conventional PON segments are neither. Therefore, conventional forwarding entities assume all devices linked to one of its ports have seen any frame delivered to that port. As a result, the forwarding entity will not send a frame back to the port that delivered the frame, even if a destination is an end user linked to the incoming PON segment.

Therefore, a method and system are needed to address the above problems.

SUMMARY OF THE INVENTION

The present invention solves the above problems by providing a method, system, and computer program product for filtering and forwarding frames within an optical network. In the preferred embodiment, the optical network is a passive optical network (PON) such as, but not exclusively, an Ethernet-based passive optical node (EPON). A tagging mechanism is implemented to uniquely identify an origin optical node that introduces a frame into the PON segment linking the origin optical node with an upstream optical line terminal (OLT). The origin optical node produces a PON tag comprising its optical node identifier (ON_ID). In an embodiment, the PON tag is included in the header of the frame to produce a PON-tagged frame.

In an embodiment, the PON tag includes a PON tag type field and a PON tag control information field. The PON tag type field indicates the presence of a PON tag. The PON tag control information field contains an ON_ID, which is typically an ON_ID for the origin optical node. When a frame is first introduced into a PON segment, the origin optical node tags the frame with a PON tag carrying its own ON_ID).

In an embodiment, the PON tag control information field also includes fields for designating a mode and filtering operation. The mode field specifies whether the frame is to be, or has been, transported over a point-to-point (P2P) communications path to a single destination, or a shared communications path to multiple destinations. The filtering operation field specifies whether the frame is to be filtered by a source identifier or destination identifier. If the filtering operation field is set to source identifier, the frame is filtered by the origin ON_ID, and if the filtering operation field is set to destination identifier, the frame is filtered by the ON_ID of a designated recipient.

The tagging mechanism of the present invention enables an OLT and/or an optical node (e.g., optical network unit or optical network terminator) to recognize the origination and/or destination of a particular frame. At a recipient optical node, acceptance or rejection of a received frame is based on its PON tag. For example, if the filtering operation field is set to source, an incoming frame is accepted at a recipient optical node if the ON_ID specified in the PON tag control information field does not match the ON_ID of the recipient optical node. If, on the other hand, the filtering operation field is set to destination, an incoming frame is accepted at a recipient optical node if the ON_ID specified in the PON tag control information field matches the ON_ID of the recipient optical node.

In another embodiment, the PON control information field only contains two fields. A first field for specifying an ON_ID, and a second field for specifying a mode. If the mode field is set for P2P service, a recipient optical node accepts an incoming frame if the ON_ID field matches the ON_ID assigned to the recipient optical node. Otherwise, the incoming frame is rejected. If, on the other hand, the mode field is set for shared service, a recipient optical node accepts an incoming frame if the ON_ID field does not match the ON_ID assigned to the recipient node. Otherwise, the incoming frame is rejected.

At an OLT, the mode (i.e., P2P or shared services) influences the filtering and forwarding processes for all received frames. For P2P services, the destination for each internal and external frame is determined. The ON_ID field is modified to designate the destination optical node. The mode field is also checked to ensure that it is set to P2P mode. Afterwards, each frame is forwarded one-by-one to its destination optical node.

For shared services, all internal frames are sent downstream to all optical nodes operating on the shared path. The mode field is checked to ensure that it is set to shared mode. Therefore, the present invention enables all PON-tagged traffic to be reflected back if it is received on a shared communications path. As for an externally-generated frame, the OLT constructs a PON tag having a null ON_ID value or an universal identifier. The mode field is set to shared mode, and the external frame is broadcast to all optical nodes operating on the shared path.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

FIG. 2a illustrates an Ethernet frame for transport over an EPON according to an embodiment of the present invention.

FIG. 2b illustrates a VLAN-tagged frame for transport over an EPON according to an embodiment of the present invention.

FIG. 2c illustrates a PON-tagged frame for transport over an EPON according to an embodiment of the present invention.

FIG. 2d illustrates a double tagged frame for transport over an EPON according to an embodiment of the present invention.

FIG. 2e illustrates a double tagged frame for transport over an EPON according to another embodiment of the present invention.

FIG. 2f illustrates a combined tagged frame for transport over an EPON according to an embodiment of the present invention.

FIG. 2g illustrates a combined tagged frame for transport over an EPON according to an embodiment of the present invention.

DETAILED DESCRIPTION OF THE INVENTION

Table of Contents

I. Introduction
II. System Overview
III. Overview of PON Tagging
IV. Operational Flow for Optical Node PON Tag Construction
V. Processing Upstream PON Tag by OLT
VI. Processing Downstream PON Tag by an Optical Node
VII. System Architecture for ONU and OLT
VIII. Exemplary System Implementation I. Introduction The present invention implements a tagging mechanism that enables the physical layer interface (PHY) to a passive optical network (PON) to emulate a point-to-point and/or shared communications link. The tagging mechanism specifies an optical node identifier and a transmission mode, which collectively influence filtering and forwarding processes for each frame bearing the tagging mechanism. If, for example, the transmission mode is set to shared services, a forwarding entity (e.g., bridge, router, etc.) broadcasts the frame to all optical nodes operating on a shared path, regardless of who transmitted the frame.

Accordingly, the tagging mechanism permits a PON-aware forwarding entity to interact with a PON segment as if the segment is a shared segment and/or a point-to-point (P2P) segment even though a PON segment is neither. Unlike a conventional forwarding entity, the PON-aware forwarding entity of the present invention does not assume all peers have seen an upstream frame. A conventional forwarding entity will not hand a frame to a destination port if it is the incoming port that received the frame. However, in the present invention, a PON-aware forwarding entity reflects back all PON-tagged frames received from a shared path.

The tagging mechanism also enables a forwarding entity to receive and process data and control messages as if they are coming from and going to multiple ports at the PON PHY interface when in reality there is only one physical port. As such, the tagging mechanism allows a MAC control layer to create virtual ports (also called "logical ports") to traffic incoming and outcoming optical signals, and supply the virtual ports to the forwarding entity for filtering and/or forwarding. In an embodiment, the PON PHY interface includes multiple physical ports. However, the present invention allows the MAC control layer to create additional virtual ports for one or more of the multiple physical ports, as required.

II. System Overview

Figure 1:
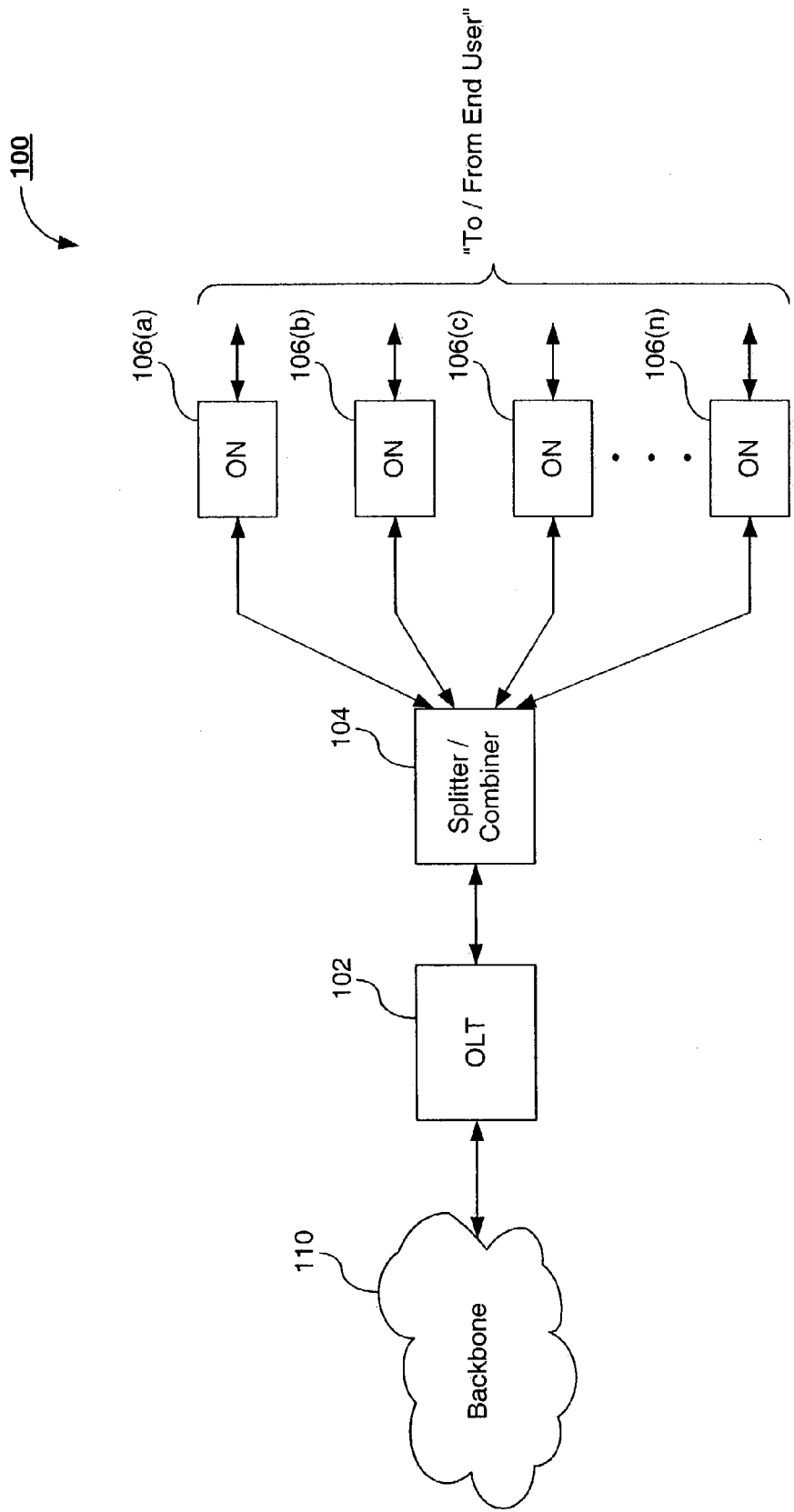
FIG. 1 illustrates an Ethernet-based optical network (EPON) according to an embodiment of the present invention.

FIG. 1 illustrates an Ethernet-based passive optical network (EPON) 100 according to an embodiment of the present invention. Although the present invention is described with reference to an Ethernet-based PON, the present invention can also be implemented in other optical networks, including ATM-PON, active optical networks, etc.

EPON 100 includes an optical line terminal (OLT) 102 and one or more widely distributed optical nodes (ON) 106a-106n (collectively referred to as "optical node (ON) 106"). EPON 100 can be implemented in any media and/or multimedia distribution network. Furthermore, it should be understood that the present invention can be implemented in any network permitting the exchange of voice, data, video, audio, messaging, graphics, other forms of media and/or multimedia, or any combination thereof.

OLT 102 is centrally positioned to command and control interactions with and among multiple ON 106. OLT 102 manages upstream and/or downstream modulation and bandwidth allocation, and executes rules and policies for classifying and/or prioritizing communications with ON 106.

ON 106 includes an optical network unit (ONU), an optical network terminator (ONT), or a combination of both. Each ON 106 is configurable to host one or more services to a subscriber end user. The services include telephony, television broadcasts, pay-for-view, video on demand, Internet communications (e.g., World Wide Web (WWW)), radio broadcasts, facsimile, file data transfer, electronic mailing services (email), messaging, video conferencing, live or time-delayed media feeds (such as, speeches, debates, presentations, infomercials, news reports, sporting events, concerts, etc.), or the like. The subscriber end user includes a home, business, multi-dwelling unit, building, or the like.

All communications transmitted in the direction from OLT 102 towards ON 106 are referred to as being in the downstream. In an embodiment, the downstream is divided into one or more downstream channels. Each downstream channel is configured to carry various types of information to ON 106. Such downstream information includes television signals, data packets (including IP datagrams), voice packets, control messages, and/or the like. In an embodiment, the downstream is formatted with an Ethernet entity. However, the present invention can be configured to support other data formats as would be apparent to one skilled in the relevant art(s).

In an embodiment, OLT 102 implements time division multiplexing (TDM) to transmit continuous point-to-multipoint signals in the downstream.

In another embodiment, OLT 102 implements wave division multiplexing (WDM) or dense wave division multiplexing (DWDM) to support communications with ON 106. In an embodiment, OLT 102 broadcasts signals to all ON 106 or multicasts signals to two or more designated ON 106. In another embodiment, OLT 102 provides unicasts to a designated ON 106.

The upstream represents all communications from ON 106 towards OLT 102. Each upstream channel carries bursts containing frames of packets from ON 106 to OLT 102. In the upstream, each frequency channel is broken into multiple assignable slots, and each ON 106 send a time division multiple access (TDMA) burst signal in an assigned slot. Each assigned slot is synchronized so that upstream packets from each ON 106 do not interfere with each other. Hence, ON 106 transmits by using grants issued by OLT 102. In another embodiment, WDM or DWDM is implemented to support communications with OLT 102.

The communication path (representing the upstream and downstream) between OLT 102 and ON 106 is referred to as the "PON segment." In an embodiment, ON 106 and OLT 102 assemble and transmit a burst of frame(s) within the PON segment over a fiber-optic link. A passive optical splitter/combiner 104 is provided to demultiplex or multiplex bi-directional communications with each individual ON 106. In another embodiment, free-space optics (FSO) technology provides the transmission medium that carries optical signals between OLT 102 and ON 106.

OLT 102 also routes signals from ON 106 to a destined location over backbone network 110. Backbone network 110, as well as the path between ON 106 and the subscriber end-users, is part of a wired, wireless, or combination of wired and wireless local area networks (LAN) or wide area networks (WAN), such as an organization's intranet, local internets, the global-based Internet (including the World Wide Web (WWW)), virtual private networks, or the like. Backbone network 110 supports wired, wireless, or both transmission media, including satellite, terrestrial (e.g., fiber optic, copper, twisted pair, coaxial, hybrid fiber-coaxial (HFC), or the like), radio, microwave, free-space optic, and/or any other form or method of transmission.

As such, OLT 102 utilizes backbone network 110 to communicate with another device or application external to EPON 100. The device or application can be a server, web browser, operating system, other types of information processing software (such as, word processing, spreadsheets, financial management, or the like), television or radio transmitter, a component of another optical network, or the like.

III. Overview of PON Tagging

The present invention provides a tagging mechanism to identify the origin ON 106 (i.e., the ON 106 that originates the frames passed within a PON segment). In an embodiment, a "PON tag type" field and a "PON tag control information" field (discussed with reference to "222" and "224", respectively, in FIG. 2c, below) are produced and/or activated to carry ONU identification information. This embodiment of the present invention enables the PON tag control information field and PON tag type field to propagate beyond the physical layer, such that the PON tag is available at the desired layer within ON 106 (and OLT 102). Thus, the present invention avoids replicas of protocol stacks since the PON tag is not necessarily placed in the preamble of a frame.

The tagging mechanism of the present invention is discussed with reference to FIGS. 2a-2g, which illustrate several embodiments of a frame that can be transported within EPON 100. First, FIG. 2a shows a frame 200a that does not include a tag. FIG. 2b shows a frame 200b that includes frame format extensions that support virtual local area network (VLAN) tagging on Ethernet networks. FIG. 2c shows a frame 200c that includes frame format extensions to support PON tagging for an EPON. FIG. 2d and FIG. 2e show two embodiments (i.e., frame 200d and 200e, respectively) that include both frame format extensions for VLAN tagging and PON tagging. Finally, FIG. 2f and FIG. 2g show embodiments (i.e., frame 200f and 200g, respectively) that include a combined frame format extension for VLAN tagging and PON tagging. As described in greater detail, below, the present invention accommodates and processes all of the above-discussed tag types, in addition to any other type of frame presently known, or developed in the future, to be formatted for transport over a PON segment.

Referring to FIG. 2a, frame 200a begins with a "preamble" field (Pre) 202. Pre field 202 gives a recipient node (e.g., OLT 102 or ON 106) time to recognize the presence of a signal before the frame data (shown as "data" field 212) arrives. Pre field 202 enables a recipient node to lock onto the signal, and synchronize the recipient node's clock with the transmitting node's clock. Following Pre field 202 is a "start of frame delimiter" (SFD) field 204. SFD field 204 demarcates the beginning of relevant MAC frame information.

The first item of relevant MAC frame information is a "destination address" (DA) field 206. DA field 206 identifies one or more network components designated to receive frame 200a. The network component is typically customer premise equipment (CPE) associated with an ON 106. DA field 206 can be an individual address for a single network component/node, a multicast address for a group of network component/nodes, or a broadcast address for all available network component/nodes.

Frame 200a also contains a "source address" (SA) field 208 that identifies a network component that originated the frame. As discussed, the network component is typically CPE associated with an ON 106.

A "length/type" field 210 is also included to specify the quantity of bytes present in data field 212. Data field 212 contains the MAC data unit. Finally, a "frame check sequence" (FCS) field 214 supports error checking. In an embodiment, a cyclical redundancy check (CRC) value is calculated when frame 200a is assembled. The CRC value is appended at the end of frame 200a in FCS field 214. Upon receipt, a recipient node performs identical checking and compares its result with the CRC value. If no match is found, frame 200a is discarded or flagged as having an error.

Referring to FIG. 2b, frame 200b includes frame format extensions that support VLAN tagging on Ethernet networks. This format is defined in IEEE standard 802.3ac for VLAN tagging, and IEEE standard 802.1Q for the VLAN protocol. As shown, VLAN-tagged frame 200b includes an identifier, or tag, that identifies the specific VLAN to which the frame belongs. The VLAN tag is shown as "VLAN tag type" field 216 and "VLAN tag control information" field 218, and is inserted between SA field 208 and length/type field 210. VLAN tag type field 216 indicates the presence of a VLAN tag, and informs the recipient node that length/type field 210 can be located at an offset of four bytes further into frame 200b. The value "81-00" represents the IEEE EtherType field assigned for use with the IEEE standard 802.1Q. VLAN tag control information field 218 contains the VLAN identifier (VID) which uniquely identifies the VLAN to which the Ethernet frame 200b belongs. VLAN tag control information field 218 also includes other information such as, a user priority field and a canonical format indicator (CFI), as defined in IEEE standard 802.1Q.

Frame 200b also includes a "PAD" field 220. PAD field 220 is optional and used to ensure that frame 200b satisfies minimum allowable size requirements. PAD field 220 is inserted and used to mitigate collision with another frame if frame 200b is too short. In embodiments, PAD field 220 can also be included in frame 200a, discussed above.

Referring to FIG. 2c, frame 200c shows frame format extensions for supporting PON tagging within an EPON. The PON-tagged frame 200c includes a "PON tag type" field 222 and a "PON tag control information" field 224, which are referred to herein collectively as a "PON tag." PON tag type field 222 is a two-byte field used to designate the presence of a PON tag within frame 200c. An IEEE EtherType field value can also be assigned for use with PON tag type 222. PON tag control information field 224 contains the control information for a specific ON 106.

In an embodiment, the control information includes an identifier (ON_ID) that uniquely identifies the origin ON 106. In an embodiment, one or more ON_s are assigned to each ON 106 by OLT 102. In an embodiment, the ON_is an address for one or more physical or logical ports at the physical interface of ON 106 to the PON segment. In another embodiment, the ON_ID is an address for one or more physical or logical ports at ON 106 that serves as the interface with one or more MAC clients or subscribers end users. In another embodiment, a separate ON_ID is assigned for the address at each port if multiple physical and/or logical ports are configured at ON 106.

Other control information located in PON tag control information field 224 includes priority data, etc. The length of PON tag control information field 224 is approximately 2 bytes, but can be smaller or larger if required.

In an embodiment, additional fields are added to the PON tag (i.e., PON tag type field 222 and PON tag control information field 224) to support additional services (such as, security) on an Ethernet network. As with frame 200b, frame 200c also includes PAD field 220 to ensure that the minimum allowable size requirements are satisfied.

Another embodiment of a PON-tagged frame (i.e., frame 200d) is shown in FIG. 2d. Frame 200d includes frame format extensions that support both VLAN tagging and PON tagging, and is therefore referred to as being a double tagged frame 200d. As shown, VLAN tag type field 216 and VLAN tag control information field 218 follow SA field 208. Thereafter, PON tag type field 222 and PON tag control information field 224 are positioned before length/type field 210. Accordingly, frame 200d provides control information for passing an Ethernet frame within a VLAN as well as a PON segment.

The positions of the VLAN tag and PON tag are not necessarily order dependent. Hence, FIG. 2e shows another embodiment of a double tagged frame 200e. In frame 200e, the PON tag type field 222 and PON tag control information field 224 precede the VLAN tag (i.e., 216 and 218). In another embodiment (not shown), the tag type fields (i.e., 216 and 222) are positioned adjacent to each other and precede the control information fields (i.e., 218 and 224), or vice versa.

FIG. 2f. illustrates another embodiment of a PON-tagged frame (i.e., frame 200f). In this embodiment, the VLAN and PON tag type fields (i.e., 216 and 222) are represented as a single combined tag specification, shown as a single combined tag type field 226. Combined tag type field 226 designates the presence of a VLAN tag, PON tag, or both. The control information for the VLAN tag and PON tag is provided in VLAN tag control information field 218 and PON tag control information field 224. Therefore, frame 200f enables an Ethernet frame to be passed within a VLAN and/or PON segment depending on the contents of fields 226, 218 and 224.

As previously discussed, the positions of the VLAN tag and PON tag are not necessarily order dependent. Hence as shown in FIG. 2g, combined tagged frame 200g shows PON tag control information field 224 preceding VLAN tag control information field 218. In another embodiment (not shown), VLAN tag control information field 218 and/or PON tag control information field 224 precedes combined tag type field 226.

Figure 3A:
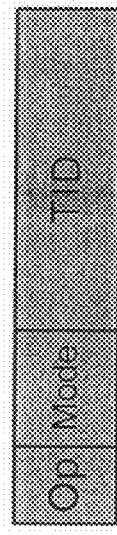
FIG. 3a illustrates a PON tag control information field of a frame according to an embodiment of the present invention.

An embodiment of PON tag control information field 224 is illustrated in FIG. 3a. As shown, PON tag control information field 224 includes a "filtering operation" (Op) field 302, a "mode" field 304, and a "tag identifier" (TID) field 306. TID field 306 contains an ON_ID as discussed above with reference to FIG. 2c. Mode field 304 specifies whether, for example, frame 200c is to be, or has been, transported over a point-to-point communications path (i.e., P2P mode), or a shared communications path (i.e., shared mode). Op field 302 specifies whether, for example, frame 200c is to be filtered by a source identifier or destination identifier. The source identifier refers to the origin ON 106, and the destination identifier refers to a designated recipient(s) ON 106. The source identifier and/or destination identifier are specified in TID field 306.

Figure 3B:
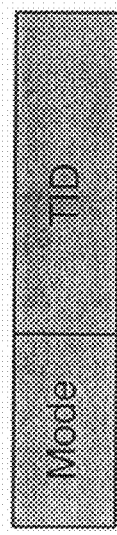
FIG. 3b illustrates a PON tag control information field of a frame according to another embodiment of the present invention.

In an embodiment, OP field 302 and mode field 304 overlap in functionality and, thus, is reduced to only one field. FIG. 3b shows an embodiment of PON tag control information field 224 that illustrates the overlapping functionality. As shown, Op field 302 has been eliminated. Mode field 304 specifies the transport mode as being P2P or shared distribution. As described in greater detail below, if mode field 304 is designated as P2P, the frame (e.g., frame 200c) is filtered by a destination identifier. Otherwise, the frame is filtered by a source identifier.

Hence, the PON tag of the present invention can be the ON_ID of the origin ON 106 or a derivative of the ON_ID value. In an embodiment, the PON tag contains additional fields for security and/or other services in addition to the forwarding fields described with reference to FIG. 3a and FIG. 3b. Moreover, as described above, the tag type information of the present invention is carried in a type field (i.e., PON tag type field 222) that is similar to, but distinguishable from, a VLAN tag (i.e., tag type field 216). However, in another embodiment, PON tagging information is carried in a preamble (e.g., Pre field 202). In other embodiments, the PON tagging information is positioned before DA field 206, between DA field 206 and SA field 208, or at other locations within the tagged MAC frame.

IV. Operational Flow for Optical Node PON Tag Construction

Figure 4:
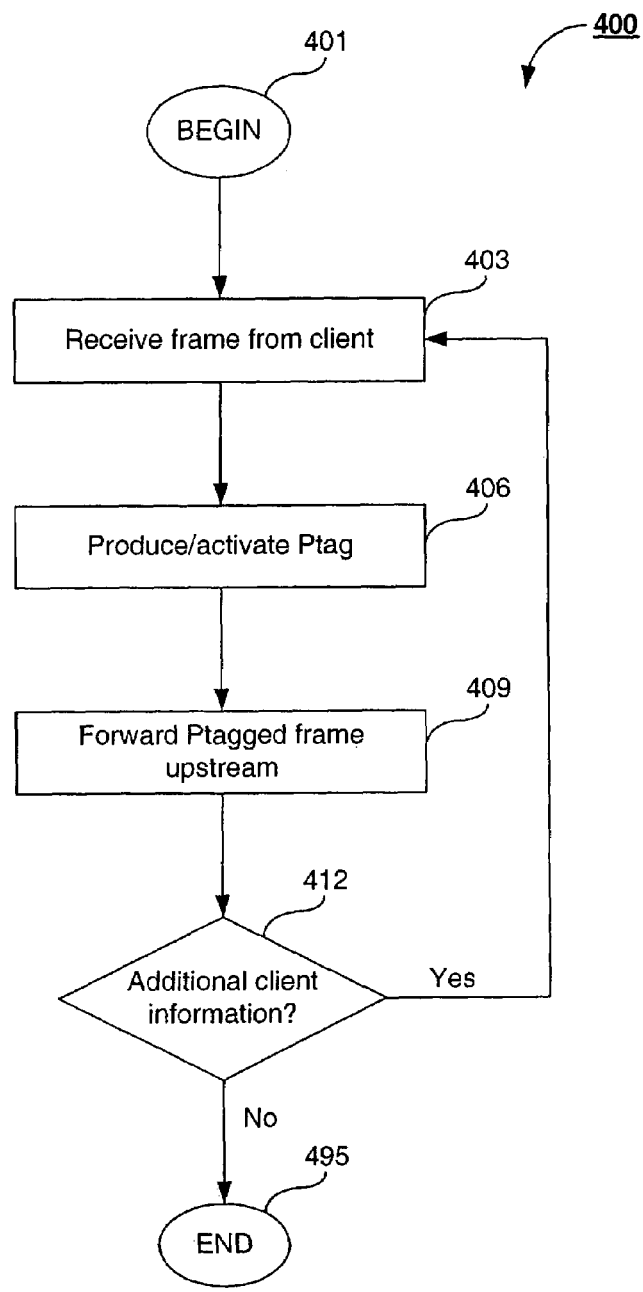
FIG. 4 illustrates an operational flow for producing and/or updating a PON tag at an optical node according to an embodiment of the present invention.

As described above, the present invention implements a tagging mechanism for tracking the origin and/or destination of a frame within a PON segment, such as the PON segment shown in FIG. 1. Referring to FIG. 4, flowchart 400 represents the general operational flow of an embodiment of the present invention. More specifically, flowchart 400 shows an example of a control flow for producing and/or updating a PON tag at an origin ON 106.

The control flow of flowchart 400 begins at step 401 and passes immediately to step 403. At step 403, an optical node (such as, ON 106) accesses information to be formatted and transmitted upstream to an OLT (such as, OLT 102). The information primarily comprises MAC client information that includes information from a subscriber end user (as shown in FIG. 1), which includes data, voice, and/or video. The MAC client information can also include control messages generated at the optical node (e.g., ON 106). For example, the control message can be a request to OLT 102 for additional bandwidth.

The information is packetized, if it is not already, into a service data unit. The optical node (e.g., ON 106) prepares a data frame (such as, for example, frame 200c described above with reference to FIG. 2c). The data frame (e.g., frame 200c) includes the service data unit in data field 212.

At step 406, a PON tag (also referred to as "Ptag") is produced and/or activated. For example referring back to the embodiment described with reference to FIG. 2c, PON tag type field 222 is added to the data frame (e.g., frame 200c) to designate the presence of a PON tag. Additionally, PON tag control information field 224 is added to specify the PON tag control information, namely the origin ON_ID. As described with reference to TID field 306 in FIG. 3a, the ON_ID can be the address for the port (logical or physical) that the origin ON_ID utilizes to transmit the PON-tagged frame. Alternatively, the ON_ID can be the address for the port that ON_ID utilizes to service a subscriber end user or MAC client associated with the PON-tagged frame. Thus, in an embodiment, the present invention implements a tagging mechanism that only specifies the origin ON_ID. In another embodiment (described below), the tagging mechanism can also specify a destination ON_ID. Accordingly, the tagging mechanism of the present invention can specify the origin ON_ID, a destination ON_ID, or both.

After the data frame has been assembled into PON-tagged frame (e.g., frame 200c), the control flow passes to step 409. At step 409, the PON-tagged frame is transmitted upstream to, for example, OLT 102. When transmitted in the upstream, the PON tag is referred to as an upstream PON tag (or Utag).

At step 412, a check is made for the presence of additional information to be transmitted upstream. If additional information is present, the control flow returns to step 403. Otherwise, the control flow ends as indicated at step 495.

V. Processing Upstream PON Tag by OLT

Figure 5:
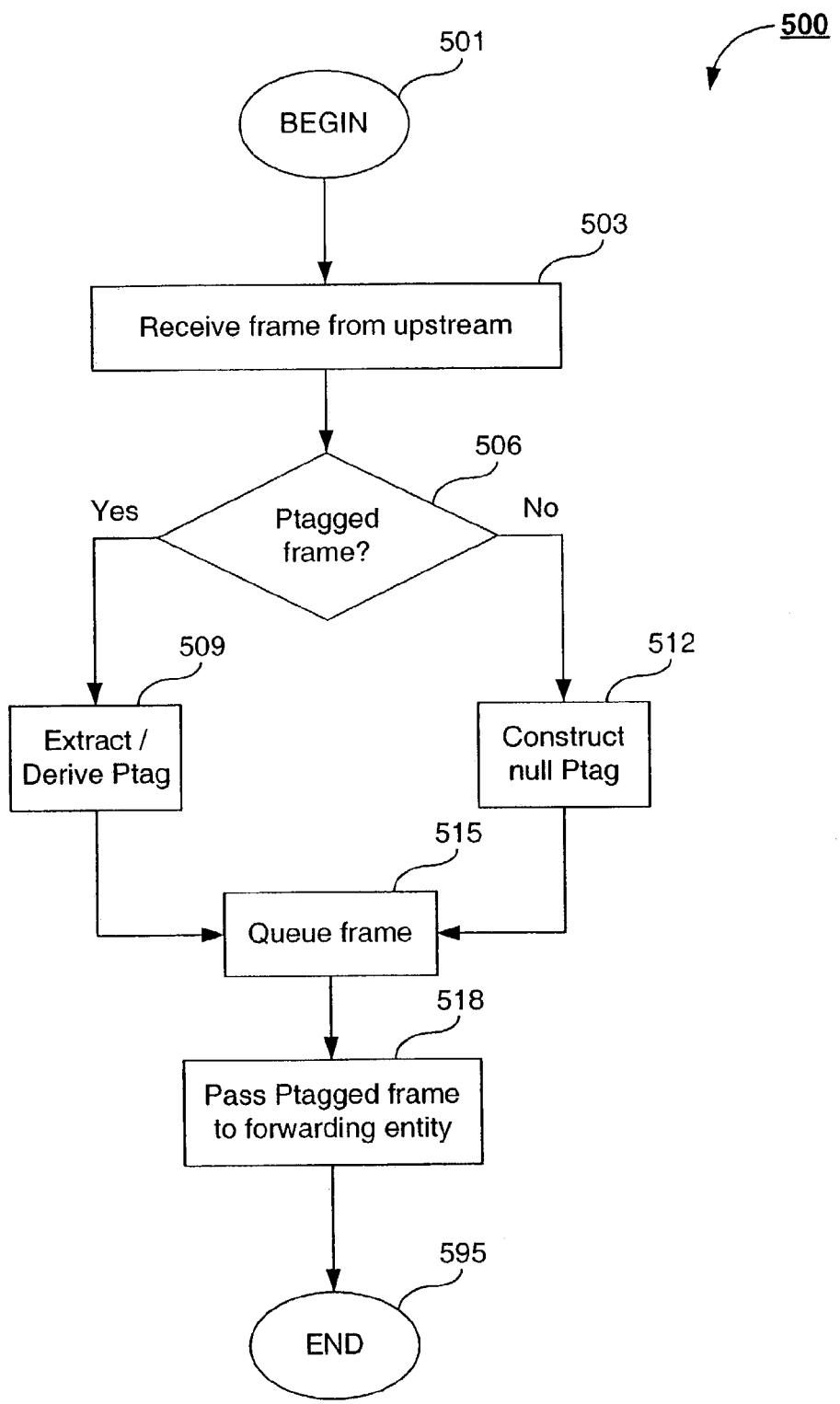
FIG. 5 illustrates an operational flow for processing and/or updating a PON tag upon reception at an OLT according to an embodiment of the present invention.

The control flow of FIG. 4 describes an exemplary tagging solution for marking a frame to designate its origin optical node (e.g., ON 106). As the frame is transported within a PON segment, a recipient can easily identify the origin of the frame. Referring to FIG. 5, flowchart 500 represents the general operational flow of another embodiment of the present invention. More specifically, flowchart 500 shows an example of a control flow for processing and/or updating a PON tag at an OLT (e.g., OLT 102) prior to passing the frame having the PON tag to a forwarding entity.

The control flow of flowchart 500 begins at step 501 and passes immediately to step 503. At step 503, an OLT (e.g., OLT 102) receives an upstream frame from the PON segment. The upstream frame is one of the embodiments of PON-tagged frames described above (i.e., frame 200c, frame 200d, frame 200e, frame 200f, or frame 200g of FIGS. 2c-2g).

The physical interface to OLT 102 supports P2P and/or shared communications. Conventionally, a PON segment is neither a P2P segment nor a shared segment. However, as described in greater detail below with reference to FIG. 9, the present invention enables an OLT (such as, OLT 102) to configure and/or reconfigure its PON segment to emulate a P2P service, downstream broadcast service, shared service, or any combination of the above. In an embodiment, OLT 102 includes a physical port that is adaptable to be designated as a P2P and/or shared port. In another embodiment, OLT 102 includes a single physical port that can be configured and/or reconfigured into multiple logical or virtual ports.

In other words, although the physical transmission medium (e.g., a fiber optic cable, free space optical link, etc.) is coupled to a single physical input/output port of OLT 102, OLT 102 or system components associated with OLT 102 are enabled to parse and/or process the information exchanged via the single physical port as if the information is being exchanged over separate physical ports. By arbitrating bandwidth among the plurality of ON 106 with respect to time, frequency, code, and/or the like, OLT 102 can create a plurality of upstream and/or downstream channels. Although these channels share a common physical port at OLT 102, the information exchanged over the single physical port is parsed and/or processed according to the designated channel (e.g., a channel identifier in the header of an upstream frame). Assigning each channel to a designated logical or virtual port, OLT 102 is enabled to operate as if the information is being exchanged over different channels, with each channel being treated as if it is being serviced over a dedicated logical port at OLT 102. As such, the physical interface to OLT 102 includes, in embodiments, one or more virtual/logical ports for P2P service, one or more virtual/logical ports for shared service, or a combination of both.

If a port (physical or logical) receives a PON-tagged frame from ON 106, the port is referred to as being part of a PON-enabled (or tag-enabled) physical interface because the port is linked to an optical element capable of producing and/or passing frames that are tagged according to the present invention. If a port (physical or logical) exclusively receives frames lacking a PON tag, the port is referred to as being part of a traditional physical interface because the port is not linked to an optical element capable of producing and/or passing frames that are tagged according to the present invention. It should be understood the expression "PON-enabled," as used herein, is not intended to be limited to passive optical networks. As previously discussed in alternate embodiments, the present invention can be implemented in other types of networks.

Accordingly, in an embodiment, OLT 102 is configured to receive and/or transmit frames only on a PON-enabled physical interface. In another embodiment, OLT 102 is configured to receive frames and/or transmit from a traditional physical interface and a PON-enabled physical interface. In an embodiment, OLT 102 includes an interface to backbone 110, which is not a PON-enabled interface, and at least one PON-enabled interface. A frame coming from the "non-PON-enabled" interface to backbone 110 is referred to as an external frame. A frame arriving from the PON-enabled interface is referred to as an internal frame. All internal frames in a PON segment are PON-tagged frames. External frames are not PON-tagged frames.

At step 506, the OLT (e.g., OLT 102) detects or searches for the presence of a PON tag. Referring back to FIGS. 2c-2g in an embodiment, a PON tag type field 222 is included to designate the presence of a PON tag. Thus, if PON tag type field 222 is found, the frame is determined to be a PON-tagged frame (e.g., frame 200c). The control flow would then pass to step 509.

Otherwise, if no PON tag is detected, the frame is determined to be a non-PON-tagged frame (such as, frame 200a or 200b). The frame is considered to have originated external to the PON segment or from a non-PON enabled port. Therefore, the control flow would pass to step 512. In an embodiment, if the PON tag (e.g., PON tag control information field 224) for a PON-tagged frame (e.g., frame 200c) is missing, lost, or damaged, the OLT (e.g., OLT 102) discards the frame if it goes to the same PON interface, or treats the frame as a non-PON-tagged frame if it goes to an external interface.

At step 509, the OLT (e.g., OLT 102) extracts or derives the PON tag value from PON tag control information field 224. This value is used to prepare a forwarding tag (or Ftag) that is appended to frame 200c. In an embodiment, the forwarding tag is the upstream PON tag. In another embodiment, the forwarding tag is identical to the ON_ID specified in the PON tag. In another embodiment, the forwarding tag is a derivative of any information in the upstream PON tag. In another embodiment, the forwarding tag is derived from any information in the original frame (including the upstream PON tag), or additional state in OLT 102.

At step 512, the OLT (e.g., OLT 102) constructs a PON tag for a non-PON-tagged frame. However since the origin optical node (e.g., ON 106) is unknown or the origin node is external to the destination PON segment, the ON_ID is set to a null value to thereby produce a "null PON tag." In an embodiment, a universal identifier (i.e., "universal ON_ID") is specified for all broadcast or multicast operations. This universal identifier is also used as the null PON tag value. The null PON tag value is used, at step 512, to prepare a forwarding tag that is appended to the frame. As intimated, the forwarding tag can be identical to, or a derivative of, the null ON_ID value. For example, referring back to FIG. 3b, the mode field 304 can be set to shared distribution or P2P. If the frame is being sent to an optical node (e.g., ON 106) having a P2P communications link with the OLT (e.g., OLT 102), the TID field 306 is set to the ON_ID for the destination ON 106, and the mode is set to P2P. Thus, the PON tag would have mode field 304 and TID field 306 values of "(P2P, destination ON_ID)." If, however, the frame is being sent an optical node (e.g., ON 106) operating on a shared communications path with the OLT (e.g., OLT 102) (or if mode is unknown), the mode field 304 and TID field 306 values would read as "(shared, universal ON_ID)."

It should be understood that a multicast or broadcast frame can be sent on a P2P path to each member of the multicast or broadcast group, or on a shared path to all optical nodes (e.g., ON 106) operating on the shared path. If sent to all optical nodes operating on a shared path, the optical nodes that are members of the multicast group would accept the frame, and the non-members would reject the frame. Similarly, it should be understood that a unicast frame can be sent on a P2P path to the designated optical node (e.g., ON 106), or on a shared path to all optical nodes (e.g., ON 106) operating on the shared path. If sent to all optical nodes operating on a shared path, the designated recipient of the unicast would accept the frame, and all other optical nodes on the shared path would reject the frame.

At step 515, the forwarding-tagged frame is queued according to the incoming port (i.e., physical port or logical port) of the physical interface that received the frame. In an embodiment, OLT 102 matches the incoming port to the frame upon receipt. In another embodiment, the incoming port is detected or extracted from one or more fields within the frame (e.g., from PON tag control information field 224). In another embodiment, OLT 102 has separate and parallel processing paths for all available ports, and queues the frames accordingly.

At step 518, the queues (designating a respective incoming port) are emptied to pass the upstream frames to a forwarding entity. In an embodiment based on logical ports, the upstream frames are passed with the forwarding tags. In an embodiment based on multiple physical ports, the upstream frames are passed over designated physical interfaces with the forwarding entity. After the upstream frames are passed to the forwarding entity, the control flow ends as indicated by step 595.

Figure 6:
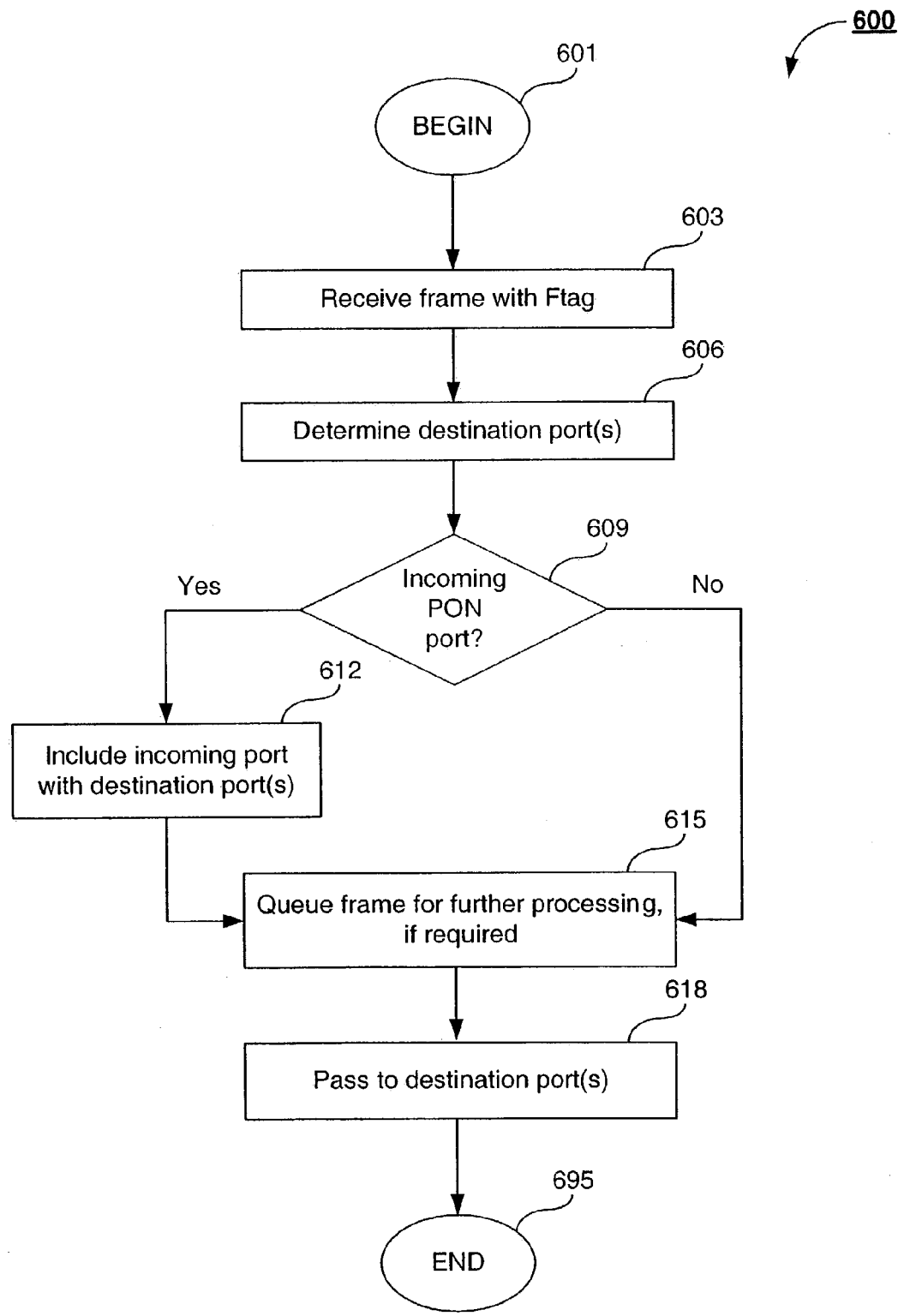
FIG. 6 illustrates an operational flow diagram for processing and/or updating a PON tag for transmission from an OLT according to an embodiment of the present invention.

Referring, now, to FIG. 6, flowchart 600 represents the general operational flow for processing and/or updating a PON tag for transmission from an OLT (e.g., OLT 102), according to an embodiment of the present invention. More specifically, flowchart 600 shows an example of a control flow for processing and/or updating a PON tag after being passed to a forwarding entity associated with an OLT (e.g., OLT 102).

The control flow of flowchart 600 begins at step 601 and passes immediately to step 603. At step 603, the forwarding entity receives a frame. In an embodiment based on logical ports, the frame includes the forwarding tag. In an embodiment based on multiple physical ports, the forwarding entity notes the incoming port that received the frame, since the frames are queued by incoming port.

At step 606, the forwarding entity determines the destination port(s) for the frame. In an embodiment, the forwarding entity uses the destination address (i.e., DA field 206) to query a look-up or forwarding table to determine the destination port(s). The table can be programmable to learn destination addresses and corresponding port(s).

At step 609, the forwarding entity considers the frame's incoming port type (i.e., a traditional physical interface or a PON-enabled physical interface). As discussed, this information is noted at step 603 from the queue. In an embodiment, the forwarding entity learns that a specific queue is associated with a specific port type. In another embodiment, a tag is appended to the frame to designate the incoming port prior to being handed to the forwarding entity, and the forwarding entity learns the port type. Alternatively, a tag can be appended, prior to delivering the frame to the forwarding entity, to designate the incoming port type. In another embodiment, a learning table is queried and/or updated to determine the port type from the incoming port. As would be apparent to one skilled in the relevant art(s), other variants, methodologies, or techniques can be used to permit the forwarding entity to become aware of the incoming port or port type.

If the incoming port is PON-enabled, at step 612, the incoming port is included as a destination port, regardless of whether it had been determined to be a destination port at step 606. As a result, a PON-tagged frame is always reflected back to the origin ON 106. In an embodiment, all upstream traffic is reflected back on all PON-enabled ports. In another embodiment, upstream traffic is only reflected back on a PON-enabled port configured for shared distributions.

On the other hand, if the incoming port is a traditional port, the control flow passes immediately to step 615. Therefore, since a forwarding entity conventionally does not transmit signals back on an incoming port, the frame is not returned to the incoming port if it is not included in the destination port(s).

At step 615, the frame is queued according to its destination port(s). The queues are subsequently emptied for further processing. If a destination port is a PON-enabled port, the OLT (e.g., OLT 102) verifies or prepares a PON tag for downstream transmission. In the downstream, the PON tag is referred to as the downstream PON tag (or Dtag).

Referring back to FIG. 3b, a representative PON tag includes mode field 304 denoted as "shared" or "P2P," and TID field 306 specifying an origin ON_ID. If mode field 304 is set to "P2P," the forwarding entity determines the PON segment destination and OLT 102 modifies, if necessary, TID field 306 to specify the "destination" ON_ID. The modified tag "(P2P, destination ON_ID)" becomes the downstream PON tag that is passed with the frame to its downstream destination. As discussed above if the frame is externally generated or from an unknown source, the PON tag would already read "(P2P, destination ON_ID)." Therefore, no modification should be required.

On the other hand if mode field 304 is set to "shared," the forwarding entity determines the group membership for the multicast or broadcast, but OLT 102 does not modify the TID field 306. The downstream PON tag is the same as the upstream PON tag, namely "(shared, origin ON_ID)" if the frame is PON-originated or "(shared, universal ON_ID)" if externally generated or from an unknown source.

If a destination port is a traditional port or if the frame is being sent to a higher layer application or MAC client of the OLT (e.g., OLT 102), the PON tag is removed. Moreover if at any step a PON-tagged frame is passed to a traditional device (e.g., bridge, router, etc.) that is not PON-aware, the PON tag is eliminated. After the frame has been passed to its destination port(s), the control flow ends as indicated by step 695.

The present invention, therefore, provides a PON-aware forwarding entity having the capability to interact with a PON segment as if the segment is one of the known segment types, namely shared, P2P, or both. Unlike a conventional forwarding entity, the PON-aware forwarding entity of the present invention does not assume all peers have seen an upstream frame. A conventional forwarding entity will not hand a frame to a destination port if it is the incoming port that received the frame. However, in the present invention, a PON-aware forwarding entity reflects back all PON-tagged frames received over a shared path.

VI. Processing Downstream PON Tag by an Optical Node

Figure 7:
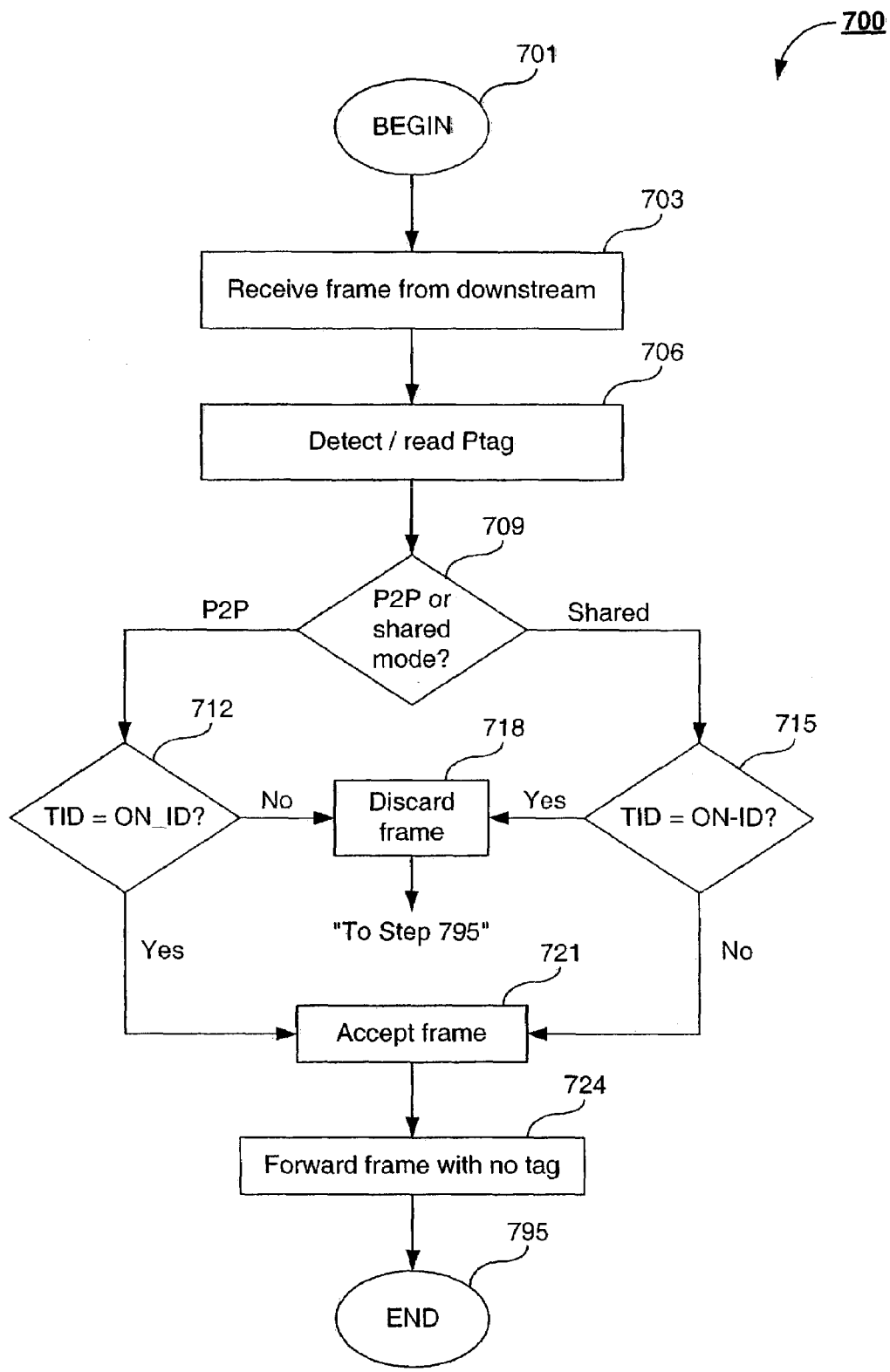
FIG. 7 illustrates an operational flow diagram for processing and/or updating a PON tag upon reception at an optical node according to another embodiment of the present invention.

As discussed, FIG. 4 describes an embodiment for producing and/or updating a PON tag for upstream transmissions. FIGS. 5-6 describe embodiments for processing and/or updating a PON tag at an OLT (e.g., OLT 102). Referring, now, to FIG. 7, flowchart 700 represents the general operational flow of the reception process at an optical node (e.g., ON 106) according to an embodiment of the present invention. More specifically, flowchart 700 shows an example of a control flow for processing and/or updating a PON tag upon delivery at an optical node (e.g., ON 106).

The control flow of flowchart 700 begins at step 701 and passes immediately to step 703. At step 703, an optical node (e.g., ON 106) receives a frame (e.g., frame 200c, 200d, 200e, etc.) from a downstream channel. At step 706, the optical node (e.g., ON 106) detects or reads a PON tag appended to the frame. As discussed, in an embodiment, PON tag type field 222 designates the frame as being a PON-tagged frame.

At step 709, the optical node (e.g., ON 106) determines whether the frame has been distributed in P2P or shared mode. In an embodiment, mode field 304 is processed to determine whether the frame is designated as being in P2P or shared mode. If P2P mode is determined, the control flow passes to step 712. Otherwise, the control flow passes to step 715 for processing shared distributions.

At step 712, the optical node (e.g., ON 106) determines whether it is the intended recipient of the frame. As discussed above, a PON-tagged frame sent downstream in P2P mode includes mode field 304 and TID field 306 values reading "(P2P, destination ON_ID). If the destination ON_ID specified in TID field 306 does not match the ON_ID of the recipient optical node (e.g., ON 106), the optical node is not the intended recipient. As such, the frame is discarded at step 718. Otherwise, the frame is accepted at step 721.

Shared mode distributions are processed at step 715. When executed, step 715 enables a recipient optical node (e.g., ON 106) to determine whether it originated a PON-tagged frame (e.g., frame 200c, 200d, 200e, etc.) received in the downstream. As discussed above, a PON-tagged frame sent on a shared downstream includes mode field 304 and TID field 306 values reading "(shared, origin ON_ID)" for PON-originated frames and "(shared, universal ON_ID)" for externally generated or unknown sourced frames. Processing TID field 306, the optical node (e.g., ON 106) determines if its ON_ID(s) matches and hence, whether it is the origin optical node (i.e., it originated the PON-tagged frame). If the recipient optical node is the origin optical node, the frame is rejected at step 718. Otherwise, it is accepted, at step 721, because the frame is determined to be produced by a peer optical node (e.g., ON 106).

This process is effective for supporting reflect-back operations of a PON-enabled OLT (e.g., OLT 102). The reflect-back operations permit one or more peer optical nodes (e.g., ON 106) to remain aware of signals transmitted upstream to the OLT (e.g., OLT 102), especially on a shared communications path. Additionally, reflecting-back permits a peer optical node on a shared path to receive the frame if an intended destination is one of the subscriber end users of the peer optical node. Conversely, traditional OLT-forwarding entities do not return the frame to the shared path peers because it assumes that the peers have already seen the frame.

If the frame (received from a shared or P2P path) is accepted, then at step 724, the PON tag is deactivated or removed from the frame and sent to a higher layer application or MAC client for further processing. Afterwards, the control flow ends as indicated by step 795.

As described above, TID field 306 designates the ON_ID as being a single node identifier. In other words, TID field 306 specifies an identifier for a single optical element of system 100 (namely, one of ON 106). It should be understood that the single node designation of TID field 306 has been described by way of example. In embodiments of the present invention, the contents or value of TID field 306 is easily extendable to support a multi-node designation. If, for example, a single ON 106 belongs to one or more groups of ON 106, a membership identifier is specified for each group. The single ON 106, therefore, retains a list of membership identifiers for each of these groups. As a frame is processed as described herein, a membership identifier is included in TID field 306 to specify source and/or destination identifiers for a multicast according to the embodiments herein described. For example, ON 106 is enabled to perform a check rule to either select a membership identifier to produce a PON tag prior to sending a frame, or to verify a membership identifier to process a PON tag prior to accepting or rejecting a frame. Similarly, OLT 102 is enabled to perform a check rule to select a membership identifier while processing or producing a downstream PON tag, as discussed above.

VII. System Architecture for ONU and OLT

Figure 8:
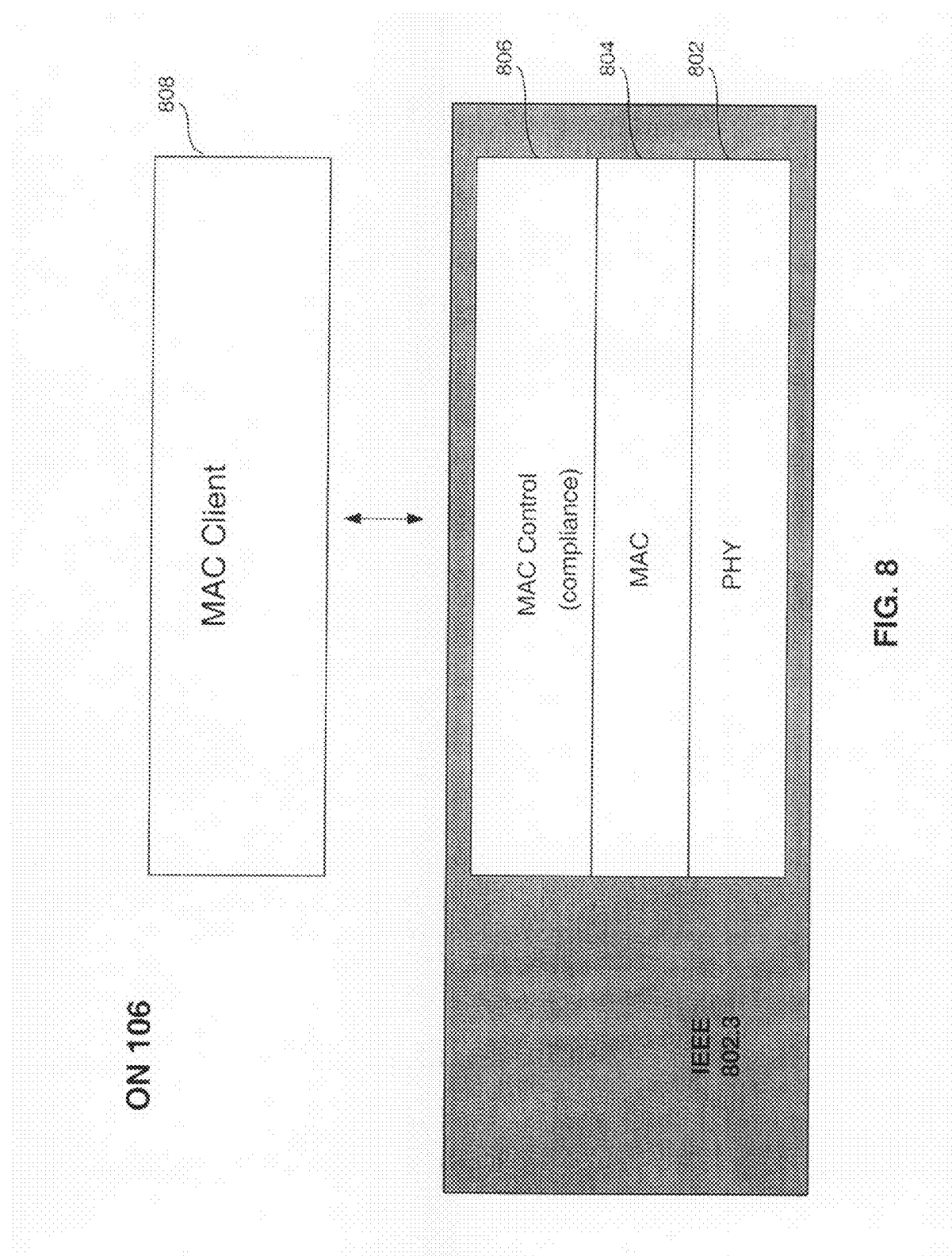
FIG. 8 illustrates an optical node according to an embodiment of the present invention.

FIG. 8 illustrates an embodiment of ON 106 that can be used to implement the present invention as described with reference to FIGS. 1-7. ON 106 includes a physical layer interface (PHY) 802, media access control (MAC) layer 804, and MAC control layer 806. In an embodiment, PHY 802, MAC 804, and MAC control 806 are configured to comply with the specifications of IEEE standard 802.3 and/or 803.3ah.

PHY 802 serves to receive and transmit signals (e.g., voice, data, video, etc.) among the subscriber end-users (shown as MAC client 808), as discussed above with reference to FIG. 1. As discussed above, ON 106 utilizes one or more physical or logical ports to communicate with OLT 102 over the PON segment. Additionally, one or more physical or logical ports are used to communicate with its end users (MAC client 808). PHY 802 also supports full duplex communications (e.g., voice, data, video, control messages) with OLT 102. Hence, PHY 802 is configurable to support electronic, electromagnetic, optical signals, and/or the like. PHY 802 modulates signals to be transmitted as bursts, and demodulates signals that it receives. In an embodiment, PHY 802 performs error checking on a received signal and/or discard the signal if errors are found.

Signals from PHY 802 are passed to MAC 804 for Ethernet protocol processing. It should be understood that the above reference to Ethernet protocol processing is provided by way of example. Hence, in alternate embodiments, MAC 804 performs protocol processing in compliance with other types of communication protocols governing multimedia distribution networks.

MAC control 806 receives frames from MAC 804 and integrates the tagging mechanism of the present invention. In an embodiment, MAC 804 takes a frame coming from MAC client 808, and appends or inserts a PON tag (e.g., PON tag type field 222 and PON tag control information field 224). The resulting PON tagged-frame (e.g., frame 200c, 200d, 200e, etc.) is queued for delivery to PHY 802.

During registration with OLT 102, ON 106 receives instructions (e.g., ON_ID and/or membership identifier values) to use in the PON tag) to establish and format the ports. At this time, ON 106 can request additional ports.

Figure 9:
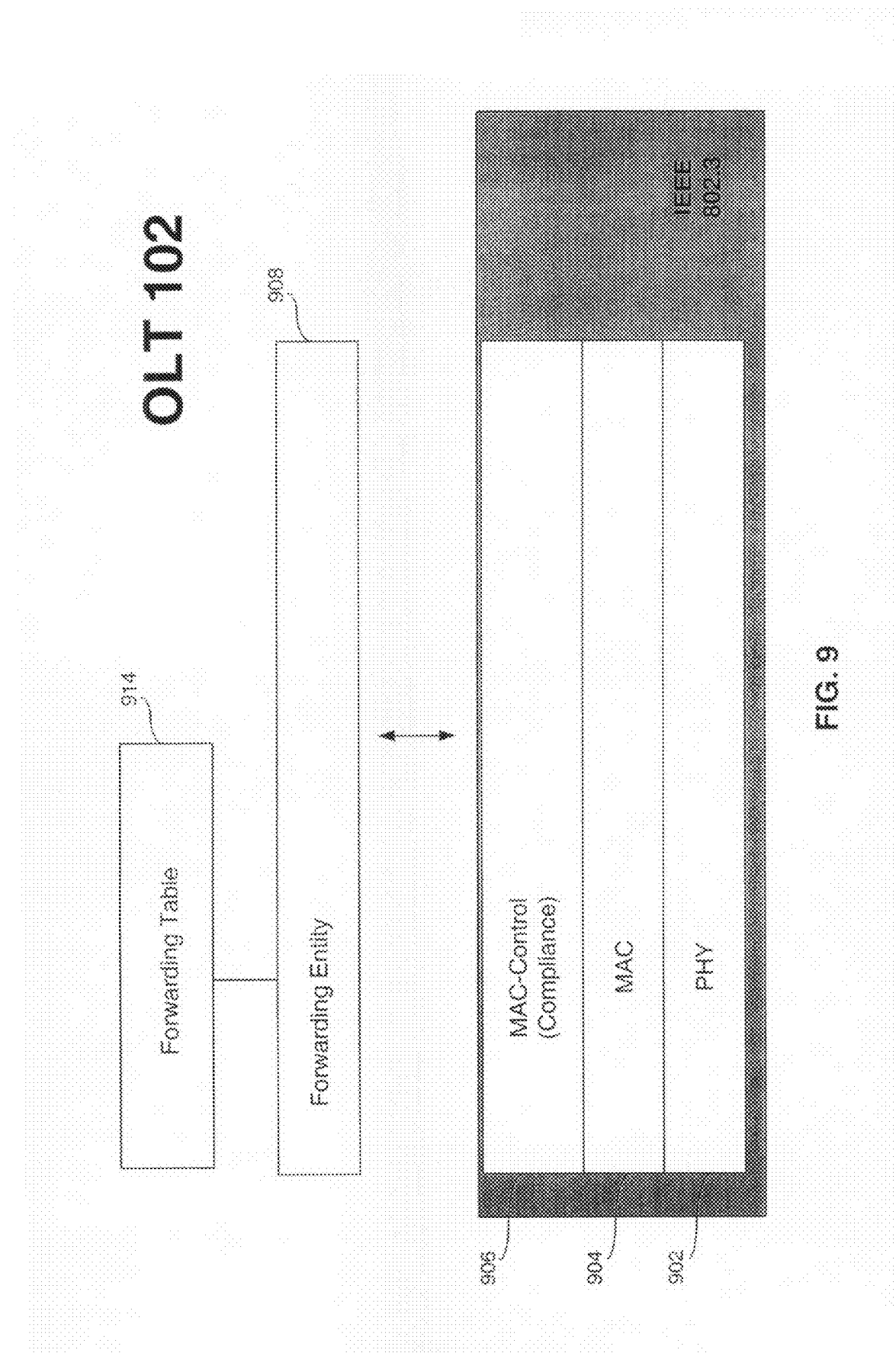
FIG. 9 illustrates an OLT according to an embodiment of the present invention.

FIG. 9 illustrates an OLT 102 according to an embodiment of the present invention. OLT 102 includes a physical layer interface (PHY) 902, media access control (MAC) layer 904, MAC control layer 906, a forwarding entity 908, and a forwarding table 914. In an embodiment, PHY 902, MAC 904, and MAC control 906 are configured to comply with the requirements of IEEE standard 802.3, and forwarding entity 908 is configured to conform to IEEE standard 802.1D, with additional functionality according to the present invention.

PHY 902 supports full duplex communications (e.g., voice, data, video, control messages) with ON 106 (or ONU 800). Accordingly, PHY 902 transmits and receives optical signals via the PON segment. PHY 902 demodulates the signals to decompress and/or extract voice, data, video, requests, other control messages, and/or the like. In an embodiment, PHY 902 performs error checking, if required. If errors are detected, the burst is discarded. In another embodiment, the burst is flagged and the error is corrected at MAC 904.

Therefore, MAC 904 performs Ethernet protocol processing. As discussed above, it should be understood that the above reference to Ethernet protocol processing is provided by way of example. Hence, in alternate embodiments, MAC 904 performs protocol processing in compliance with other types of communication protocols governing multimedia distribution networks.

MAC control 906 processes, updates, and/or constructs the PON tag of the present invention. In an embodiment, MAC control 906 reads or extracts the PON tag received from PHY 902 and produced by the origin ON 106, and prepares a forwarding tag, as described above. If MAC control 906 receives a frame lacking a PON tag (e.g., an external frame), a null PON tag is constructed, as described above. The null PON tag is appended to the frame as its forwarding tag. The frame (with forwarding tag) is queued according to the incoming port that received the frame from the upstream.

Forwarding entity 908 (such as a bridge, router, etc.) reads destination address (e.g., DA field 206) and queries forwarding table 914 to determine the destination port(s) for each frame. Forwarding table 914 includes disposition instructions for forwarding information (e.g., frame 200a, 200b, 200c, 200d, etc.) delivered to OLT 102. The disposition instructions include, but are not limited to, a destination port (physical or logical) corresponding to a destination or source address, port mirror requirements, frame handling requirements, prioritization, multicast group membership, and/or like features. In an embodiment, forwarding table 914 is programmable to learn port associations with MAC or PON addresses, and/or forwarding table 914 is responsive to periodic or on-demand updates, regarding the port associations, from an operator interface, software application, or another control system. In an embodiment, forwarding table 914 is programmable to store a PON tag with the associated frame.

Upon receipt of disposition instructions, forwarding entity 908 filters and queues the frames to be forwarded to the destination port(s). Forwarding entity 908 is a PON-aware forwarding entity, and therefore, forwarding entity 908 forwards back a frame to its incoming port if the incoming port is a PON port. Additionally, forwarding entity 908 includes a plurality of physical or logical ports for downstream transmissions to ON 106. One or more shared physical or logical ports support shared communications, and multiple physical or logical ports support P2P communications. Each ON 106 has a designated physical or logical port for P2P communications. Thus, in an embodiment OLT 102 includes a single physical port to the PON segment, multiple logical ports configured for P2P and/or shared paths, and another physical port to backbone 110. In another embodiment, OLT 102 includes multiple physical ports with or without logical ports.

After the frames have been filtered into the appropriate destination port, the frames (with their appended forwarding PON tags) are forwarded to MAC control 906. MAC control 906 updates or prepares a downstream PON tag (or Dtag) for each frame. The frame then passes to MAC 904 for further formatting or protocol processing, and to PHY 902 to be transmitted to its downstream destination.

VIII. Exemplary System Implementation

FIGS. 1-9 are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 10:
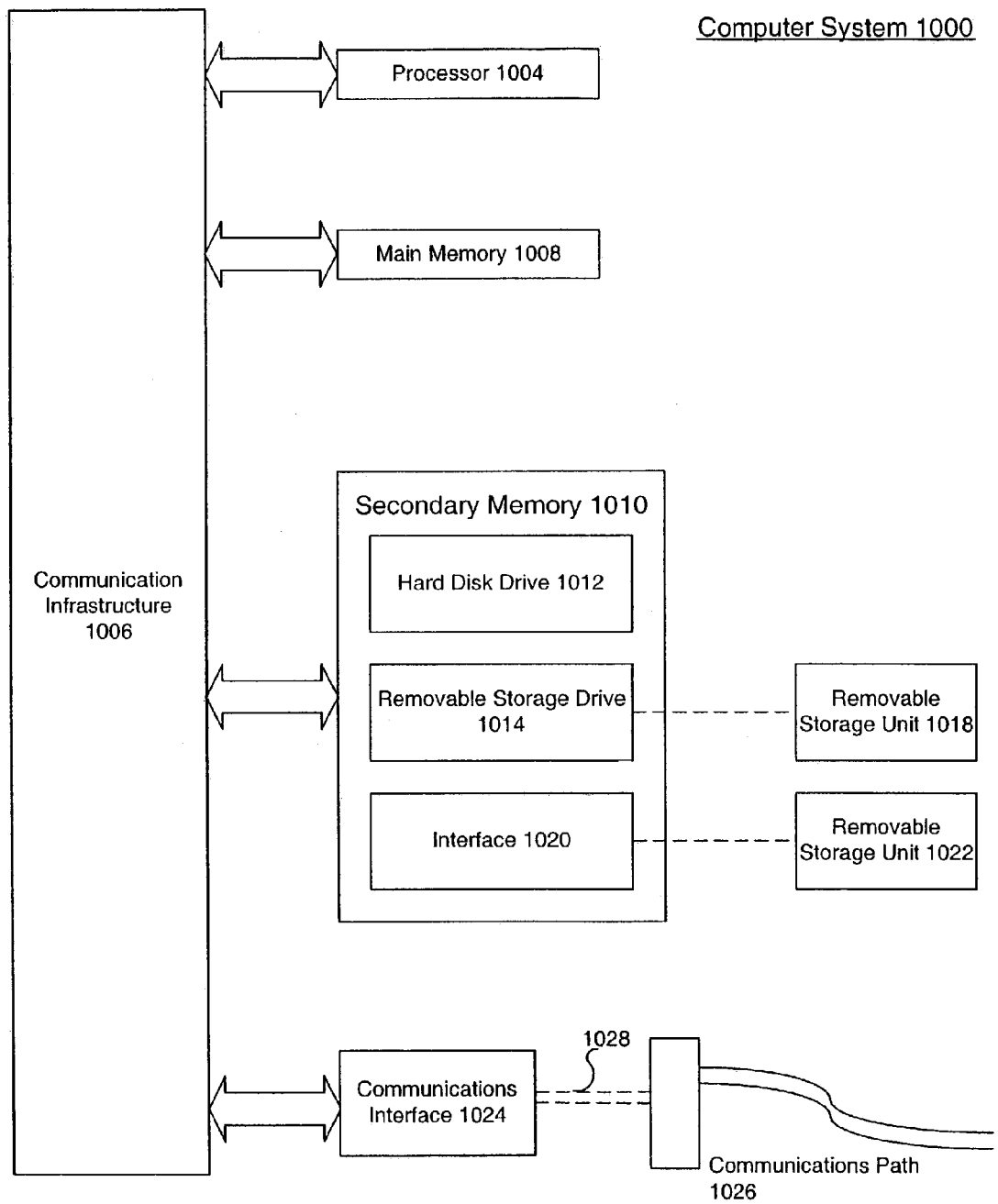
FIG. 10 illustrates an example computer system useful for implementing the present invention.

Additionally, the present invention can be implemented in one or more computer systems capable of carrying out the functionality described herein. Referring to FIG. 10, an example computer system 1000 useful in implementing various components or steps of the present invention is shown. Various embodiments of the invention are described in terms of this example computer system 1000. After reading this description, it will become apparent to one skilled in the relevant art(s) how to implement the invention using other computer systems and/or computer architectures.

The computer system 1000 includes one or more processors, such as processor 1004. Processor 1004 can be a special purpose or a general purpose digital signal processor. Processor 1004 is connected to a communication infrastructure 1006 (e.g., a communications bus, crossover bar, or network). Various software implementations are described in terms of this exemplary computer system. After reading this description, it will become apparent to a one skilled in the relevant art(s) how to implement the invention using other computer systems and/or computer architectures.

Computer system 1000 also includes a main memory 1008, preferably random access memory (RAM), and can also include a secondary memory 1010. The secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well-known manner. Removable storage unit 1018 represents a floppy disk, magnetic tape, optical disk, etc. As will be appreciated, the removable storage unit 1018 includes a computer usable storage medium having stored therein computer software (e.g., programs or other instructions) and/or data.

In alternative implementations, secondary memory 1010 includes other similar means for allowing computer software and/or data to be loaded into computer system 1000. Such means include, for example, a removable storage unit 1022 and an interface 1020. Examples of such means include a program cartridge and cartridge interface (such as that found in video game devices), a removable memory chip (such as, an EPROM or PROM) and associated socket, and other removable storage units 1022 and interfaces 1020 which allow software and data to be transferred from the removable storage unit 1022 to computer system 1000.

Computer system 1000 can also include a communications interface 1024. Communications interface 1024 allows software and/or data to be transferred between computer system 1000 and external devices. Examples of communications interface 1024 include a modem, a network interface (such as an Ethernet card), a communications port, a PCM-CIA slot and card, etc. Software and data transferred via communications interface 1024 are in the form of signals 1028 which can be electronic, electromagnetic, optical, or other signals capable of being received by communications interface 1024. These signals 1028 are provided to communications interface 1024 via a communications path (i.e., channel) 1026. Communications path 1026 carries signals 1028 and can be implemented using wire or cable, fiber optics, a phone line, a cellular phone link, an RF link, free-space optics, and/or other communications channels.

In this document, the terms "computer program medium" and "computer usable medium" are used to generally refer to media such as removable storage unit 1018, removable storage unit 1022, a hard disk installed in hard disk drive 1012, and signals 1028. These computer program products are means for providing software to computer system 1000. The invention, in an embodiment, is directed to such computer program products.

Computer programs (also called computer control logic or computer readable program code) are stored in main memory 1008 and/or secondary memory 1010. Computer programs can also be received via communications interface 1024. Such computer programs, when executed, enable the computer system 1000 to implement the present invention as discussed herein. In particular, the computer programs, when executed, enable the processor 1004 to implement the processes of the present invention, such as the method(s) implemented using components of OLT 102 and/or ON 106 described above, such as various steps of methods 400, 500, 600, and/or 700, for example. Accordingly, such computer programs represent controllers of the computer system 1000.

In an embodiment where the invention is implemented using software, the software can be stored in a computer program product and loaded into computer system 1000 using removable storage drive 1014, hard drive 1012, interface 1020, or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented in any multi-nodal communications environment governed by centralized nodes. The nodes include, but are not limited to, cable modems and headends, as well as communication gateways, switches, routers, Internet access facilities, servers, personal computers, enhanced telephones, personal digital assistants (PDA), televisions, set-top boxes, or the like. Thus, the present invention should not be limited by any of the above-described exemplary embodiments, but should be defined only in accordance with the following claims and their equivalents.

What is claimed is:

1. A method for filtering and forwarding information in an optical network, comprising the steps of:
    accessing a frame carrying client information from an incoming port in communications with one or more optical elements of the optical network;
    detecting a presence or absence of an optics control tag integrated with said frame;
    determining a distribution mode for said frame;
    passing said frame with said optics control tag to one or more destination ports for communicating with one or more corresponding destination addresses for said frame, wherein said passing step includes passing said frame with said optics control tag to said incoming port in response to determining said distribution mode being designated for a shared service; and
    forwarding said frame with said optics control tag from said one or more destination ports to said one or more corresponding destination addresses, whereby said frame with said optics control tag is reflected-back from said incoming port in response to said determining a shared service.

2. The method of claim 1, further comprising the steps of:
    constructing a null tag in response to detecting the absence of said optics control tag; and
    integrating said null tag with said frame to thereby produce said optics control tag.

3. The method of claim 2, further comprising the steps of:
    enabling said null tag to designate said distribution mode for a point-to-point service and to specify an identifier for a destination optical element, in response to determining said destination optical element is receiving point-to-point service; and
    enabling said null tag to designate said distribution mode for a shared service and to specify an universal identifier for a group of destination optical elements, in response to determining said frame is designated for delivery to an optical element receiving shared service.

4. The method of claim 1, further comprising the step of:
    determining said frame to include an optics control tag and a distribution mode designated for a point-to-point service, whereby said frame is not reflected-back from said incoming port.

5. The method of claim 1, further comprising the step of:
    passing said frame with said optics control tag to a forwarding entity to determine said one or more destination ports, wherein said forwarding entity decides whether to pass said frame to said incoming port.

6. The method of claim 1, further comprising the step of:
    querying a forwarding table to determine said one or more corresponding destination addresses.

7. The method of claim 1, wherein said one or more corresponding destination addresses include an address for one of said one or more optical elements and/or an address for a MAC client coupled to one of said one or more optical elements.

8. The method of claim 1, wherein said determining a distribution mode step further comprises the step of:
    processing said optics control tag to determine said distribution mode, said distribution mode being designated for a point-to-point service or a shared service.

9. The method of claim 1, wherein said determining a distribution mode step further comprises the step of:
    determining said distribution mode from a destination address.

10. The method of claim 1, further comprising the step of:
    verifying and/or updating said optics control tag prior to passing said frame to said one or more destination ports.

11. The method of claim 10, further comprising the steps of:
    verifying and/or updating said optics control tag to specify an identifier for a destination optical element, in response to determining said distribution mode being designated for a point-to-point service;
    verifying and/or updating said optics control tag to specify an identifier for a source optical element, in response to determining said distribution mode being designated for a shared service; and
    verifying and/or updating said optics control tag to specify a universal identifier for a group of destination optical elements, in response to determining said frame as originating from an external or unknown source and determining said frame is not being sent to a single destination optical element.

12. The method of claim 1, further comprising the steps of:
    passing said frame to a destination port for communicating with a device external to the optical network; and
    forwarding said frame without said optics control tag to said device.

13. A system for forwarding frames in an optical network, comprising:
    upstream communications means for transmitting an optical signal carrying client information on a communications path designated to emulate shared distributions in the optical network, wherein said upstream communications means includes upstream tag control means for integrating an optics control tag with said client information, wherein said optics control tag includes instructions for forwarding said client information within the optical network;

primary communications means for managing communications with said upstream communications means, wherein said primary communications means includes primary tag control means for detecting said optics control tag; and forwarding means for filtering and/or forwarding said client information according to said optics control tag, wherein said forwarding means is responsive to receiving said client information from said primary communications means and reflect back said client information to said upstream communications means on said communications path.

14. The system of claim 13, wherein said communications path is designated to emulate shared distributions to optical elements receiving shared service.

15. The system of claim 13, wherein the optical network is a passive optical network.

16. The system of claim 13, wherein said optical signal includes an Ethernet-formatted frame carrying client information.

17. The system of claim 13, wherein said communications path is part of a HFC network.

18. The system of claim 13, wherein said upstream tag control means is a MAC Ethernet entity, said MAC Ethernet entity including a physical interface layer, a media access control layer, and a MAC control layer.

19. The system of claim 13, wherein said primary tag control means is a MAC Ethernet entity, said MAC Ethernet entity including a physical interface layer, a media access control layer, and a MAC control layer.

20. The system of claim 13, wherein said primary communications means includes a physical interface to said communications path, wherein said physical interface includes at least one physical port for transmitting and/or receiving said client information.

21. The system of claim 13, wherein said primary communications means includes a physical interface to said communication paths, wherein said physical interface includes at least one logical port for transmitting and/or receiving said client information.

22. The system of claim 13, wherein said forwarding means is a router.

23. The system of claim 13, wherein said forwarding means is a bridge.

24. An optical line terminal for managing the exchange of information within an optical network, comprising:

interfacing means for accessing client information from a communications path designated to emulate shared distributions in the optical network;

an optics tag detector for detecting a presence of an optics control tag integrated with said client information;

a forwarding entity for filtering and/or forwarding said client information according to said optics control tag, wherein said forwarding entity is reflect back said client information on said communications path; and a forwarding table for tracking disposition instructions, wherein said forwarding table returns disposition instructions to said forwarding entity in response to queries regarding said client information.

25. The optical line terminal of claim 24, further comprising:

a tag constructor for constructing a null optics control tag in response to said optics tag detector being unable to detect the presence of an optics control tag.

26. The optical line terminal of claim 24, wherein said forwarding table is programmable to learn an association of destination ports with destination addresses for said client information.

27. The optical line terminal of claim 24, wherein said forwarding entity reflects back said client information in response to said disposition instructions.

28. The optical line terminal of claim 24, further comprising:

a tag constructor for updating said optics control tag in response to said disposition instructions being returned by said forwarding table.

29. The optical line terminal of claim 24, wherein said interfacing means accesses information from at least one communications path designated to emulate point-to-point distributions in the optical network, wherein said forwarding entity is responsive to forwarding information over said communications path designated for said shared distributions and/or said communications path designated for said point-to-point distributions.

30. The optical line terminal of claim 29, wherein said communications path is designated to emulate shared distributions to optical elements receiving shared service.

31. The optical line terminal of claim 29, wherein said communications path is designated to emulate point-to-point distributions to an optical element receiving point-to-point service.

32. The optical line terminal of claim 29, wherein a physical interface of the optical line terminal to said communications path includes at least one physical port.

33. The optical line terminal of claim 29, wherein a physical interface of the optical line terminal to said communications path includes at least one logical port.

* * * * *

UNITED STATES PATENT AND TRADEMARK OFFICE
CERTIFICATE OF CORRECTION

PATENT NO. : 7,349,394 B2  Page 1 of 1
APPLICATION NO. : 10/353054
DATED : March 25, 2008
INVENTOR(S) : Sala et al.

It is certified that error appears in the above-identified patent and that said Letters Patent is hereby corrected as shown below:

- Title Page, Item (75), Inventors section "John O. Limb, Atlanta, GA (US)" should be replaced with --John O. Limb, Green Cove Springs, FL (US)--.

- Title page, Item (63), Related U.S. Application Data section "application No. 10/361,181" should be replaced with --application No. 10/316,181--.

Signed and Sealed this

First Day of July, 2008

JON W. DUDAS
*Director of the United States Patent and Trademark Office*